(12) United States Patent
Galvin

(10) Patent No.: US 7,409,054 B2
(45) Date of Patent: *Aug. 5, 2008

(54) SYSTEM AND METHOD FOR INTEGRATED RESOURCE SCHEDULING, TASK ALLOCATION AND AGENT WORK MANAGEMENT

(75) Inventor: Brian R. Galvin, Albuquerque, NM (US)

(73) Assignee: Genesys Telecommunications Laboratories, Inc, Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/551,485

(22) Filed: Oct. 20, 2006

(65) Prior Publication Data

US 2007/0121899 A1 May 31, 2007

Related U.S. Application Data

(63) Continuation-in-part of application No. 10/373,395, filed on Feb. 24, 2003, now Pat. No. 7,127,059, and a continuation-in-part of application No. 10/373,391, filed on Feb. 24, 2003, and a continuation-in-part of application No. 10/373,393, filed on Feb. 24, 2003.

(60) Provisional application No. 60/359,375, filed on Feb. 25, 2002, provisional application No. 60/359,361, filed on Feb. 25, 2002, provisional application No. 60/359,371, filed on Feb. 25, 2002.

(51) Int. Cl.
*H04M 3/523* (2006.01)
*G05B 19/418* (2006.01)

(52) U.S. Cl. ............... 379/265.03; 379/265.04; 379/265.05; 379/265.06; 379/265.07; 700/100; 705/9

(58) Field of Classification Search ................. 379/265.01–265.08, 266.07; 705/8, 9; 700/99–102
See application file for complete search history.

(56) References Cited

U.S. PATENT DOCUMENTS 5,546,452 A * 8/1996 Andrews et al. ............ 379/219
6,128,380 A * 10/2000 Shaffer et al. ......... 379/265.01

(Continued)

*Primary Examiner*—Harry S Hong
(74) *Attorney, Agent, or Firm*—Central Coast Patent Agency, Inc.

(57) ABSTRACT

According to the invention, a system and method for integrating agent scripting, call routing and workforce management functions in contact centers, enabling them to work together without opposing the influence of the workforce management system against those of the other two systems, is disclosed. In an embodiment of the invention, a feedback mechanism is provided between the agent scripting engine and either the forecasting engine or the adherence module of the workforce management system, or both. This feedback mechanism is used to pass useful information dynamically between the said workforce management system and the said agent scripting engine, said information exchange being unidirectional in either direction, or bidirectional. A similar feedback mechanism is provided between the routing system and either the forecasting engine or the adherence module of the workforce management system, or both. This second feedback mechanism is used to pass useful information dynamically between the said workforce management system and the said call routing system, said information exchange being unidirectional in either direction, or bidirectional. In another embodiment of the invention, a method in which information is passed from an agent scripting engine and a call routing system to the forecasting engine or adherence module of a workforce management system, or both, is disclosed.

5 Claims, 6 Drawing Sheets

U.S. PATENT DOCUMENTS 6,324,282 B1 * 11/2001 McIllwaine et al. .... 379/265.06
7,110,525 B1 * 9/2006 Heller et al. ........... 379/265.11
7,127,059 B2 * 10/2006 Galvin ................. 379/265.03
2002/0052770 A1 * 5/2002 Podrazhansky ................ 705/7

* cited by examiner

SYSTEM AND METHOD FOR INTEGRATED RESOURCE SCHEDULING, TASK ALLOCATION AND AGENT WORK MANAGEMENT

The present application is a combination/continuation in part of patent application Ser. No. 10/373,395 filed on Feb. 24, 2003 now U.S. Pat. No. 7,127,059, which claims priority to provisional application No. 60/359,375 filed Feb. 25, 2002. The present application also combination/continuation in part of co-pending patent application Ser. No. 10/373,391 filed on Feb. 24, 2003, which claims priority to provisional application No. 60/359,361 filed Feb. 25, 2002. The present application also a combination/continuation in part of co-pending patent application Ser. No. 10/373,393 filed on Feb. 24, 2003, which claims priority to provisional application No. 60/359,371 filed Feb. 25, 2002. All and each of the disclosures of prior applications mentioned above are herein incorporated herein in their entirety at least by reference.

BACKGROUND OF THE INVENTION

The task of generating optimized schedules for contact center agents and other related resources has been known for years to be a complex one, and has spawned an entire industry of companies which provide products, of varying sophistication, which attempt to provide optimal resource scheduling for contact centers. Known as workforce management systems, the products known in the art generally perform a common series of sequential tasks in order to accomplish the scheduling function. Referring to FIG. 1, the first step of workforce management is to gather historical data on call volumes 100 for the contact centers in question; this data is generally broken out by call activities or skills, such as sales, service, complaints, etc. Data 101 is also obtained, similarly segregated by activity or skill, for the average handling time of calls, which is the total time a call takes within the contact center from start to completion (which is usually defined as the time when the agent who handled the call last completes any call-related work after the caller is released). Note that "call" as used in discussing the present invention can be a traditional phone call carried by the public switched telephone network (PSTN), a voice-over-IP (VOIP) call, an e-mail, or any other customer interaction arriving at or commencing in a contact center.

Second, the data on call volumes and handle times is run through a forecasting engine 102 to generate a forecast 103 of anticipated call volumes and handle times for the period to be scheduled. The technique used to create the forecast can be one of a multitude of techniques known in the art, including but not limited to neural network forecasting, statistical forecasting, template-based forecasting, genetic algorithms and neural networks where the weighting functions are determined by genetic algorithms. The forecast is then modified by the inclusion of the anticipated effects on call volume and handling times resulting from upcoming events such as catalog mailings, television advertisements, and so forth. The modified forecast is then used to generate a forecast of agent resource demand 104, based on the forecast and the desired agent occupancy rates 105 (that is, if you need 9 agents on calls and agents are intended to be busy 90% of the time they are on duty, then you will need 10 agents available to handle the expected traffic). Note that "agent resource" usually refers to human agents but can also refer to interactive voice response (IVR) ports against which scripts have been loaded to handle customer interactions automatically. Usually but not necessarily, this agent resource demand forecast is generated in 15 minute increments for the entire schedule period.

Next, a scheduling engine 106, which takes into account a plurality of business rules 107 concerning break policies, shift schedules, maximum and minimum workweeks, meal scheduling, and other related scheduling influences, creates an optimized overall schedule 108 which includes specific work times for each agent. Often agent preferences and vacation requests are included in this scheduling step. These scheduling engines 106, like the forecasting engines 102, use a plurality of well-known optimization techniques to generate a schedule which ensures that the expected traffic is handled within established service level limits while meeting as many of the business rules and agent preference constraints as possible. Finally, during the period the schedule is in effect, an adherence monitor 109 measures conformance to the schedule in real time, usually by integration of the workforce management system with one of the many interaction management engines 110 known in the art (including for example automated call distribution systems, computer-telephony integration systems, e-mail management systems). Usually a graphic display of the current performance of the contact center relative to the forecast is provided, showing where deviations from the forecast and the schedule are occurring, and showing what their effect is on service levels.

In parallel with the emergence in the art of computer-implemented workforce management systems working as described above, and referring to FIG. 2, there have emerged in the last decade a number of very sophisticated routing engines 203 which determine, in real time, how to allocate calls and other tasks to agent resources. These systems generally receive event notification 202 of the arrival of a new interaction (or of a transferred interaction that requires redirection) from the interaction management engine 110. They then execute scripts which can take into account data concerning current agent availability 204, statistical results 205 of recent operations, customer information 206 (such as loyalty level, profitability, identity of agent who last handled, and so forth), and call data 207 such as ANI and DNIS, in order to select which of the available agents is the most appropriate to receive the interaction. When all appropriate agents are busy, the routing engine 203 applies an appropriate treatment to the call, such as playing music or an announcement informing the caller that all agents are busy, and then waits for an agent to become available. When an agent does become available, the routing engine 203 then chooses the most appropriate call to deliver to that agent, from among the plurality of calls awaiting an available agent. It then sends routing instructions 208 to the interaction management engine 110, which relays this information to a media server 200 such as a PBX with ACD or an e-mail server.

In parallel with the emergence in the art of computer-implemented workforce management systems and routing systems working as described above, and referring to FIG. 3, there are many methods in the art for controlling the sequence of tasks performed by contact center agents when handling customer calls. Collectively these systems are often referred to as agent scripting systems, although often the agent scripting function is embedded in larger systems, most commonly customer relationship management systems, of which agent scripting is one component of many. These systems comprise a scripting engine 301 which controls the sequence of activities on a plurality of agent desktops 302. The scripting engine 301 generally receives notification of events relating to calls managed by a media server 300 from the interaction management system 110. These events include, but are not limited to, the Ringing event (announcing call arrival at a particular agent location), the Established event (announcing successful completion of a connection between called parties, the Released event (announcing the termination of a call), and various events concerned with call transfers, conferences, and data updates. The scripting engine 301 executes scripts which take into account the nature of the event received and the data that goes with it concerning the interaction, as well as data concerning current agent activities, customer information obtained from a customer information database 303 (such as loyalty level, profitability, identity of agent who last handled, and so forth), and optionally information and direction received from one or more supervisor stations 304. A typical example of the sequence of events managed by the scripting engine 301 starts with the Ringing event, which is, in most systems known in the art, accompanied by call data and user-defined data such as account number. The scripting engine 301 uses the data received with the Ringing event to retrieve customer data from the customer information database 303. The scripting engine 301 then directs the agent desktop 302 to display a "screen pop" showing the agent who is calling and why, and either automatically sends a request to the interaction management engine 110 to answer the call, or displays an answer button on the agent desktop 302 and waits for the agent to push this button before sending the request. The answer request is transmitted by the interaction management system 110 to the media server 300 which in turn completes the communications channel between the caller and the agent's communications device (telephone, e-mail software, or the like). The scripting engine 301 thereafter supplies the agent desktop 302 with a series of prompts advising the agent what to say, and receives from the agent desktop 302 the results of these actions (such as customer responses to questions). The scripting engine 301 is capable of performing branching logic based on the results of the actions on the agent desktop 302 and, thereby, is able to fully manage a large range of customer interactions, thus allowing the agent to deliver a higher quality of service with a given level of training. The scripting engine 301 can be one of many types well known in the art, including among others compiled computer programs, web-based business rules script servers using ECMAScript, XML, or any of a plurality of scripting languages, or a system in which business rules are stored as records in a database and retrieved and executed as needed.

The problem which the present invention addresses is that these three important technologies in the contact center industry in fact often work against one another. Workforce management products that follow the sequence of steps outlined above (which means all workforce management products in the art) rely on two key implicit assumptions. First, workforce management products assume that the future will behave much like the past—this is a central assumption of the forecasting step. It means that call volumes and call handle times are external variables that do not depend on any other systems in the contact center—they are what they are, and they can be forecast based on historical data. Second, workforce management products implicitly assume call volumes and handling times are independent variables relative to each other. Frustrating these assumptions is the fact that modern, sophisticated routing systems all operate independently of the workforce management systems. Routing engines 203 take the staffing available at the moment, the statistical behavior in the immediate past (usually the last hour or so), and the current call volume, and use this information to make routing decisions. It is easily within the capability of existing routing engines 203 to change call volumes for various skills or activities by diverting some calls away from agents to IVR ports in heavy traffic periods (thus increasing the volume for the IVR and decreasing the volume for the agent population which would have gotten the call). For organizations with multiple sites, calls can be diverted to other sites to avoid congestion. Quite often, routing engines 203 are tasked to dynamically change their target list (the list of agents considered as appropriate for a given interaction), in response to traffic conditions, time the call has been waiting, and so forth. Further frustrating these workforce management forecasting assumptions is the fact that modern, sophisticated agent scripting systems all operate independently of the workforce management systems. Scripting engines 301 walk the agent through potentially complex scripts which have numerous branching points and which, accordingly, introduce a significant amount of volatility into the key parameter of average handle time (AHT). It is not uncommon to have AHT vary by several hundred percent from call to call, even among seemingly simple calls of the same type. And when scripts are changed, even subtly, the changes can often introduce very large changes in the statistical behavior of AHT. Workforce management forecasting engines 102 use historical statistical samples of AHT as a core element of the forecasting engine's 102 algorithm, so if large variations in the behavior occur, the forecasts 103 will inevitably be inaccurate. Also, if agents are prompted to conference in other agents, or to transfer calls to other agents, as part of the scripting engine's 301 logic, then the call volume element of the forecasts 103 used in creating the schedule 108 will be inaccurate. Each of these routing and agent scripting actions acts to invalidate the core assumptions of the workforce management forecasting engine 102, and in fact, the problem invariably gets worse as more sophisticated (i.e., more useful) routing strategies and agent scripts are deployed. Existing workforce management systems were designed with basic ACD (automatic call distribution) queuing in mind and do not work well with modern routing engines 203 or agent scripting engines 301.

BRIEF DESCRIPTION OF THE DRAWINGS

The present invention is described in conjunction with the appended figures.

DETAILED DESCRIPTION OF THE PREFERRED EMBODIMENT

The ensuing description provides preferred exemplary embodiments only, and is not intended to limit the scope, applicability or configuration of the invention. Rather, the ensuing description of the preferred exemplary embodiments will provide those skilled in the art with an enabling description for implementing a preferred exemplary embodiment of the invention. It should be understood that various changes may be made in the function and arrangement of elements without departing from the spirit and scope of the invention as set forth in the appended claims.

Embodiments of the present invention disclose a system and method for integrating the call routing, agent scripting and workforce management functions described above, in order to enable them to work together without opposing the influence of one against those of the others.

Figure 1:
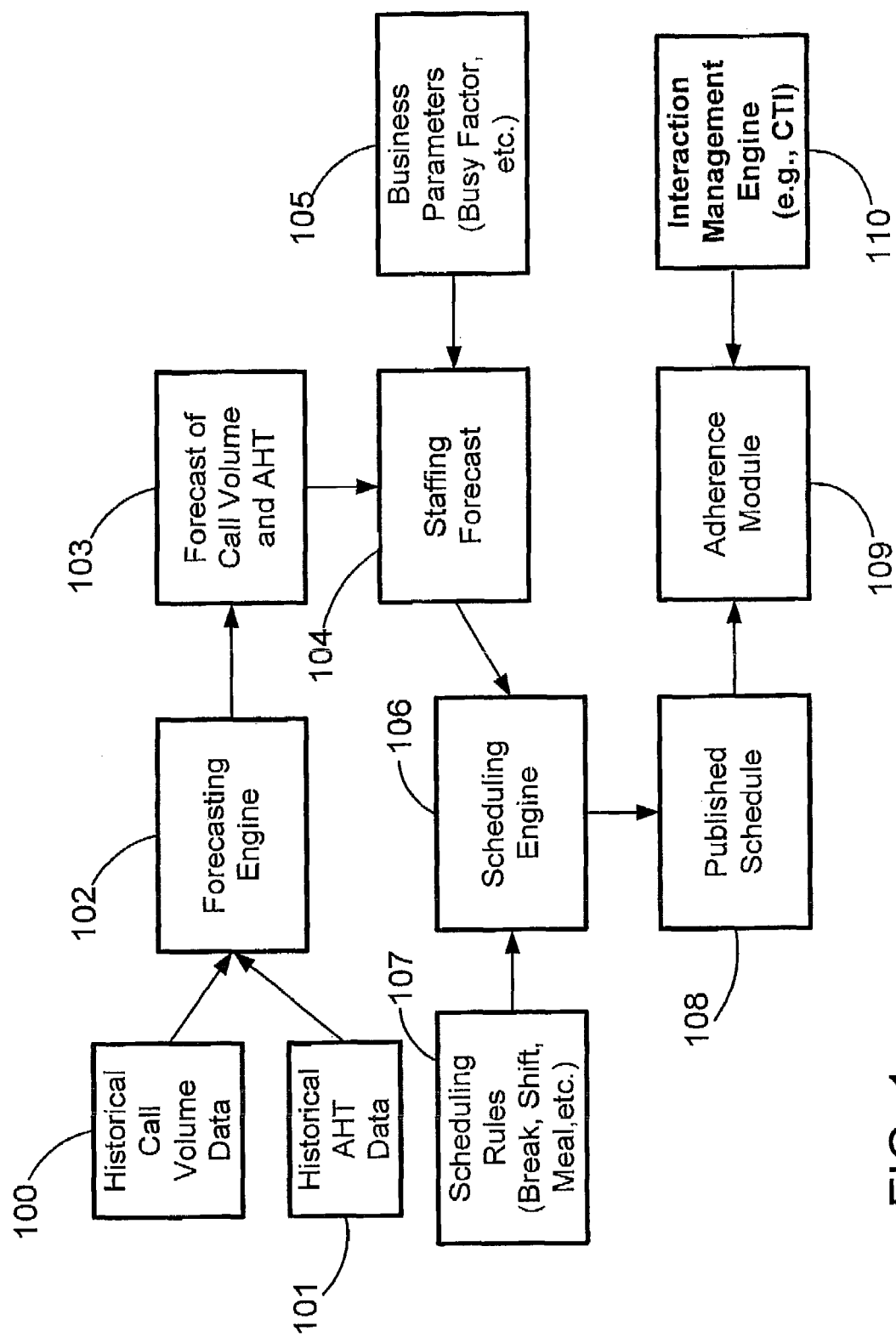
FIG. 1 is a diagram of a typical prior art workflow management system.
Figure 2:
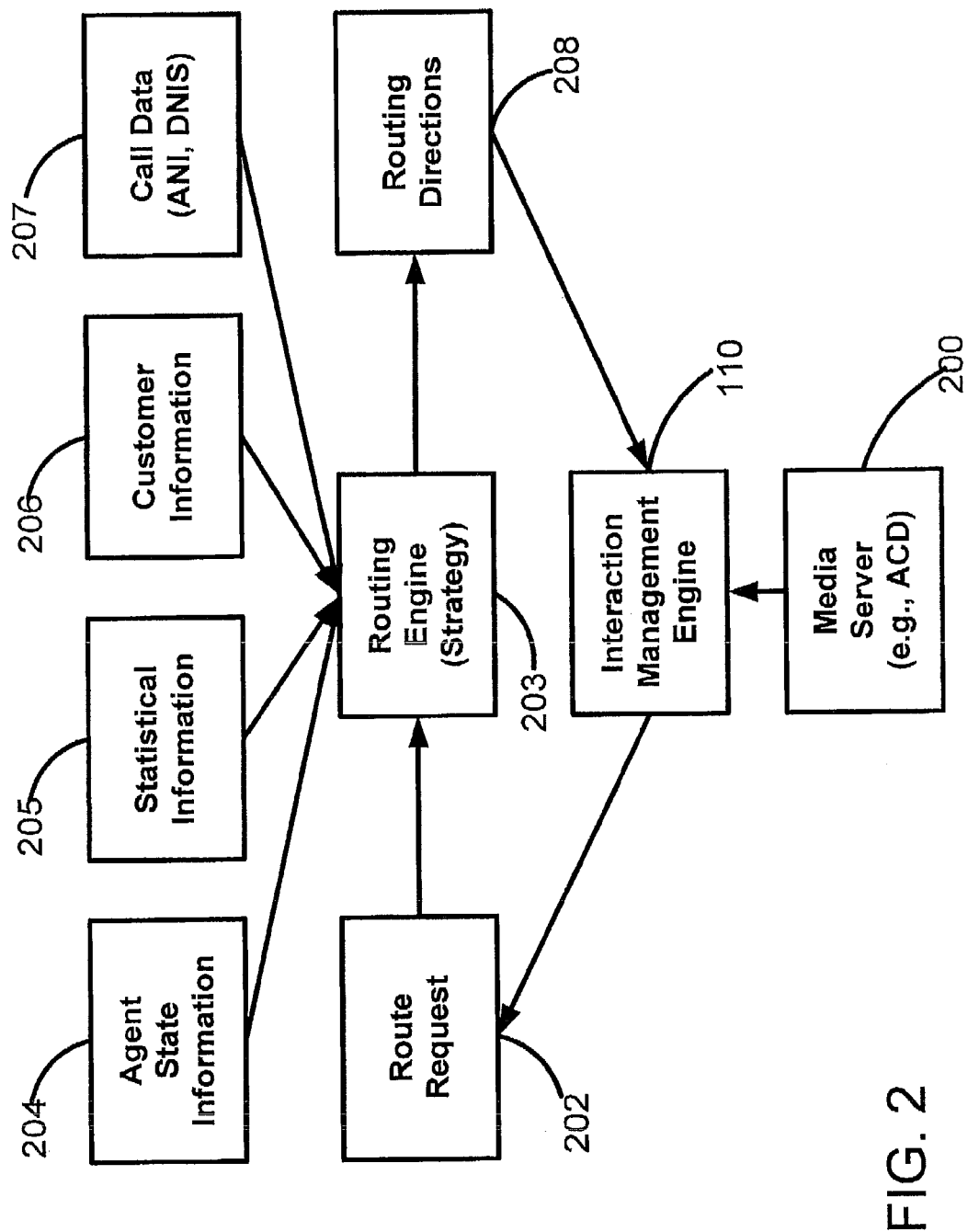
FIG. 2 is a diagram of a typical prior art routing system.
Figure 3:
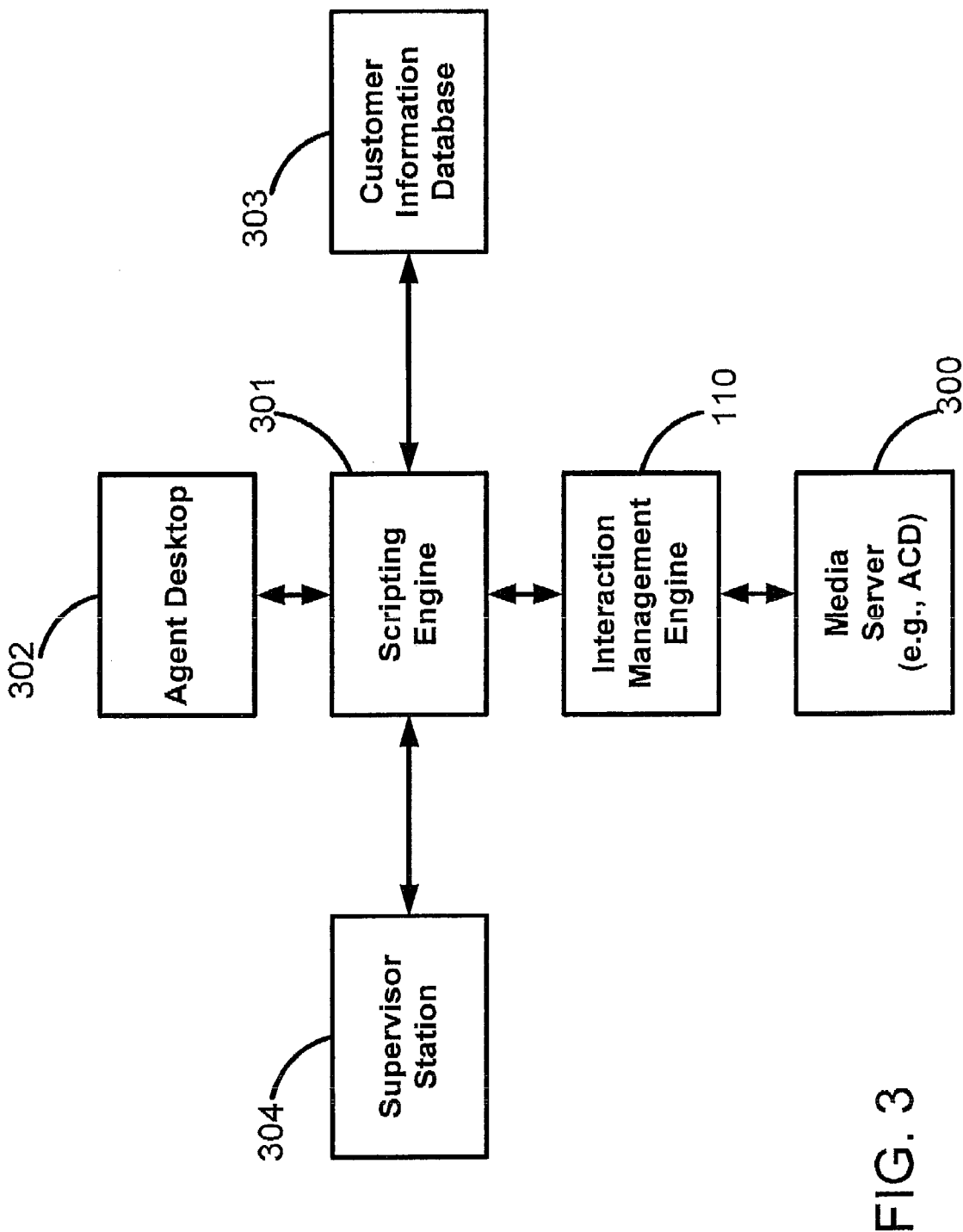
FIG. 3 is a diagram of a typical prior art agent scripting system.
Figure 4:
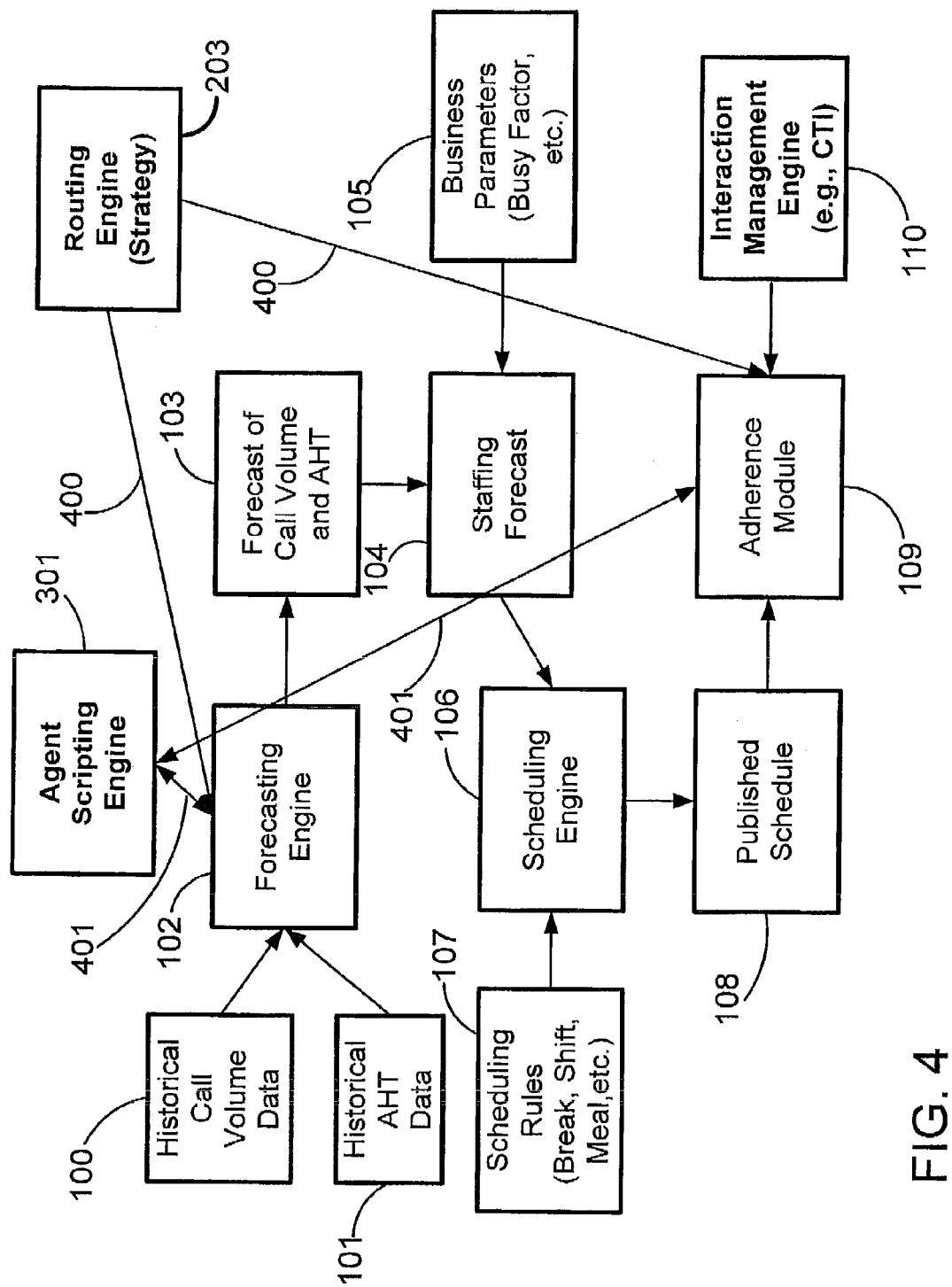
FIG. 4 is a diagram of a workflow management system showing an embodiment of the present invention.

In one preferred embodiment of the present invention, and referring to FIG. 4, a workforce management (WFM) system of the type described above and well-known in the art is modified by the addition of feedback means 400 and 401 from the routing engine 203 and the agent scripting engine 301, respectively, to the forecasting engine 102 or the adherence module 109, or both. The information passed via this mechanism can be any information available to the routing engine 203 or the agent scripting engine 301, and can be passed in any of a number of ways well established in the art. In an embodiment of the invention, the information is passed from the routing engine 203 or the agent scripting engine 301 to the forecasting engine 102 or the adherence module 109 or both via data that is "attached" to the call, or added to the data about the call that is maintained by the predefined interaction management engine 110. This is a common method in the art of passing contextual data concerning an ongoing interaction from one part of an interaction management system to another, in this case from routing to WFM. In another embodiment, data is passed directly from the routing engine 203 or the agent scripting engine 301 to the forecasting engine 102 or the adherence module 109 or both in the form of an XML data tree, another method well established in the art. In yet another embodiment, information can be passed from the routing engine 203 or the agent scripting engine 301 to the forecasting engine 102 or the adherence module 109 or both by insertion into a database table which is periodically read by the recipient components.

In a preferred embodiment of the present invention, the information from the routing engine 203 is a matrix of permissible cross-linkages between skills or activities. If each row of the matrix, and the corresponding column, are taken to represent a single skill level or activity which is used in forecasting and scheduling by the WFM system, then a 1 represents a permissible linkage from the skill corresponding to the row to the skill corresponding to the column. A permissible linkage means that the routing engine 203 will, if wait times are too long or available agent population is too small or for any other reason suitable to the routing logic, route a call for the first skill (corresponding to the row) to an agent with the second skill (corresponding to a column). For example, a 1 at (Sales 1, Sales 2)—which signifies the element at the intersection of the row corresponding to Sales 1 skill and the column corresponding to Sales 2 skill—means that a call that normally requires a Sales 1 skill may be routed by the routing engine 203 to an agent with a Sales 2 skill if conditions warrant. A zero corresponds to a non-permissible transition. This matrix can be used by the forecasting engine 102 to reduce forecast volatility by taking into account the fact that spikes in traffic in one skill may be mitigated by sending some of the calls to a second skill.

In another embodiment of the present invention, real-time data on the distribution of calls requiring different skills is sent via the feedback mechanism 400 from the routing engine 203 to the forecasting engine 102 to accelerate the creation of accurate forecasts when new skills are introduced. When new skills are introduced, or when a new routing strategy is introduced that segments calls in a new way, the forecasting engine 102 is unable to create a forecast because there is no data available yet that breaks calls out in the corresponding way. In some cases, as when sophisticated routing is being introduced to an ongoing operation, the only data available will be bulk data, typically broken out by DNIS (e.g., Sales can be distinguished from Service, but not much more). In other cases, more refined segmentation may be available, but it may be different than the new scheme and therefore useless to the forecasting engine 102. With updates received from the routing engine 203 after the introduction of the new skill or strategy, the forecasting engine 102 will be able to determine what proportion of the calls for each category for which it does have historical data is due to each of the new segments (in other words, if there is data by DNIS, the forecasting engine will be able to determine what percentage of calls to a particular DNIS correspond to each new segment). When enough data points have been gathered from the routing engine 203 so that the cumulative percentages vary only slightly over time, the forecasting engine 102 can then apply them retroactively to the data it has already collected, thus arriving at an accurate forecast relevant to the new routing strategy quickly.

In another embodiment of the present invention, the information received from feedback means 401 is a notification from the agent scripting engine 301 to the adherence module 109 that the behavior of the agents is about to change. This could be because of a script change, or because an operating script changes a key parameter in response to operating conditions. For example, if the agent scripting engine 301 notes that a certain type of transactions is taking longer than expected, and when it is informed by the interaction management system 110 that the service level drops below some threshold, then the scripting engine 301 will eliminate certain prompts that it had been delivering to the agent desktop 302 previously. Since this change will change the dynamics of the plurality of agent desktops 302 and accordingly the statistical variations in AHT, it is desirable for the scripting engine 301 to notify the adherence engine 109 and the forecasting engine 102 so that intraday forecasts can be adjusted and adherence measured against the revised forecast.

In another embodiment of the present invention, real-time data on the state changes undergone by the various agent desktops 302 during the course of operations of the contact center is sent via the feedback mechanism 401 from the agent scripting engine 301 to the forecasting engine 102 to accelerate the creation of accurate forecasts when new scripts are introduced. When new scripts are introduced, the forecasting engine 102 is unable to create an accurate forecast 103 because there is no data available yet that reflects the new dynamics of the contact center. In some cases, as when sophisticated scripting is being introduced to an ongoing operation, the only data available will be bulk data, typically broken out by DNIS (e.g., Sales can be distinguished from Service, but not much more). In other cases, more refined segmentation may be available, but it may be different than the new scheme and therefore useless to the forecasting engine 102. With updates received from the agent scripting engine 301 after the introduction of the new script, the forecasting engine 102 will be able to determine the new AHT statistics for each category of call for which it does have historical data. When enough data points have been gathered from the scripting engine 301 so that the cumulative percentages vary only slightly over time, the forecasting engine 102 can then apply them retroactively to the data it has already collected, thus arriving at an accurate forecast 103 relevant to the new script quickly.

Figure 5:
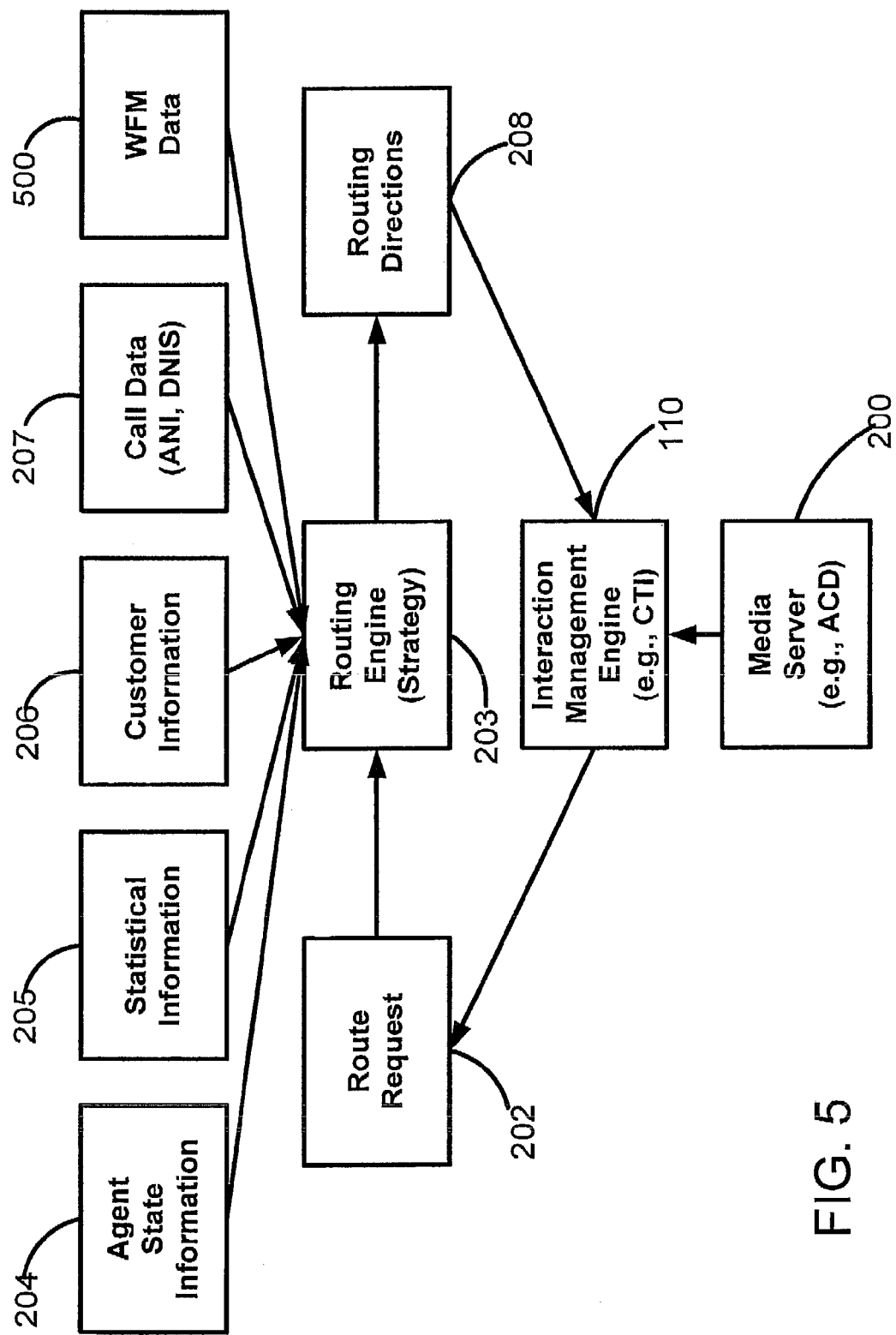
FIG. 5 is a diagram of a routing system showing an embodiment of the present invention.

In another embodiment of the present invention, and referring to FIG. 5, the routing system described previously is modified by the availability of WFM Data 500, which can be generated either by the Adherence Module 109 or other components of the WFM system. The information that can be passed via this mechanism can be any information available to the workforce management system, and can be passed in any of a number of ways well established in the art. In an embodiment of the invention, the information is passed from the Adherence Module 109 or other components of the WFM system to the routing engine 203 via data that is "attached" to the call, or added to the predefined interaction information maintained by the interaction management engine 110. This is a common method in the art of passing contextual data concerning an ongoing interaction from one part of an interaction management system to another, in this case from routing to WFM. In another embodiment, data is passed directly from the Adherence Module 109 or other components of the WFM system to the routing engine 203 in the form of an XML data tree, another method well established in the art. In yet another embodiment, information can be passed from the Adherence Module 109 or other components of the WFM system to the routing engine 203 by insertion into a database table which is periodically read by the recipient components.

In an embodiment of the present invention, the WFM data 500 is adjusted forecast data for the next forecasting increment (typically but not always, 15 minutes). Most WFM systems in the art continually update the forecast during the day to reflect deviations from the initial forecast 104 that have occurred. While most routing engines 203 have access to real time statistical information concerning contact center operations, this data is necessarily retrospective. Having access to the adherence module's 109 forecast of the next time increment makes it possible for routing strategies to proactively react to impending problems before they hit. For instance, if the adherence monitor 109 informs the routing engine 203 that the noon time segment is likely to have traffic at 125% of forecast, and service levels very far below the standard set for the contact center as a result, then the routing engine 203 can begin to send lower value or lower complexity calls to an IVR for automated processing. Since routing engines 203 today have tremendous flexibility in how to handle calls, including even offering the caller an incentive to hang up and get a callback at an agreed time in the future, it will be seen that this ability of the adherence module 109 to warn the routing engine 203 of impending problems will enable the routing engine to mitigate the effect of those problems. When the routing system and the workflow management system work together, it becomes possible to more closely achieve service level goals of a contact center with reduced staffing, because the workforce management system can be more conservative in its scheduling given that the routing engine can compensate for deviations from forecast.

In another embodiment of the present invention, the workforce management engine 102 sends information on staffing to the routing engine, and the adherence module 109 updates that information by informing the routing engine 203 of any deviations from the staffing plan. The information so provided can be at a skill level, as for example that there will be 10 Sales agents coming on duty in 5 minutes, or at the individual level, as for example that agent Bob Jones is scheduled to be online in 5 minutes. In the first case, this information can be used by the routing engine 203 to tune the routing strategy to take advantage of the new knowledge. For example, calls which might have gone to overflow because the current sales agents are busy could be held, with an announcement, for five minutes to take advantage of the upcoming availability of several more sales agents. In the second case, this information would be very useful in applications where a caller is to be routed to the agent who last handled the caller (a common scenario in support operations); if the information were not available, the routing engine would have to route to an alternate agent, but now the routing engine can inform the caller that the agent who handled the caller last will be available in approximately five minutes, and the caller could be given the option to wait for that agent.

Figure 6:
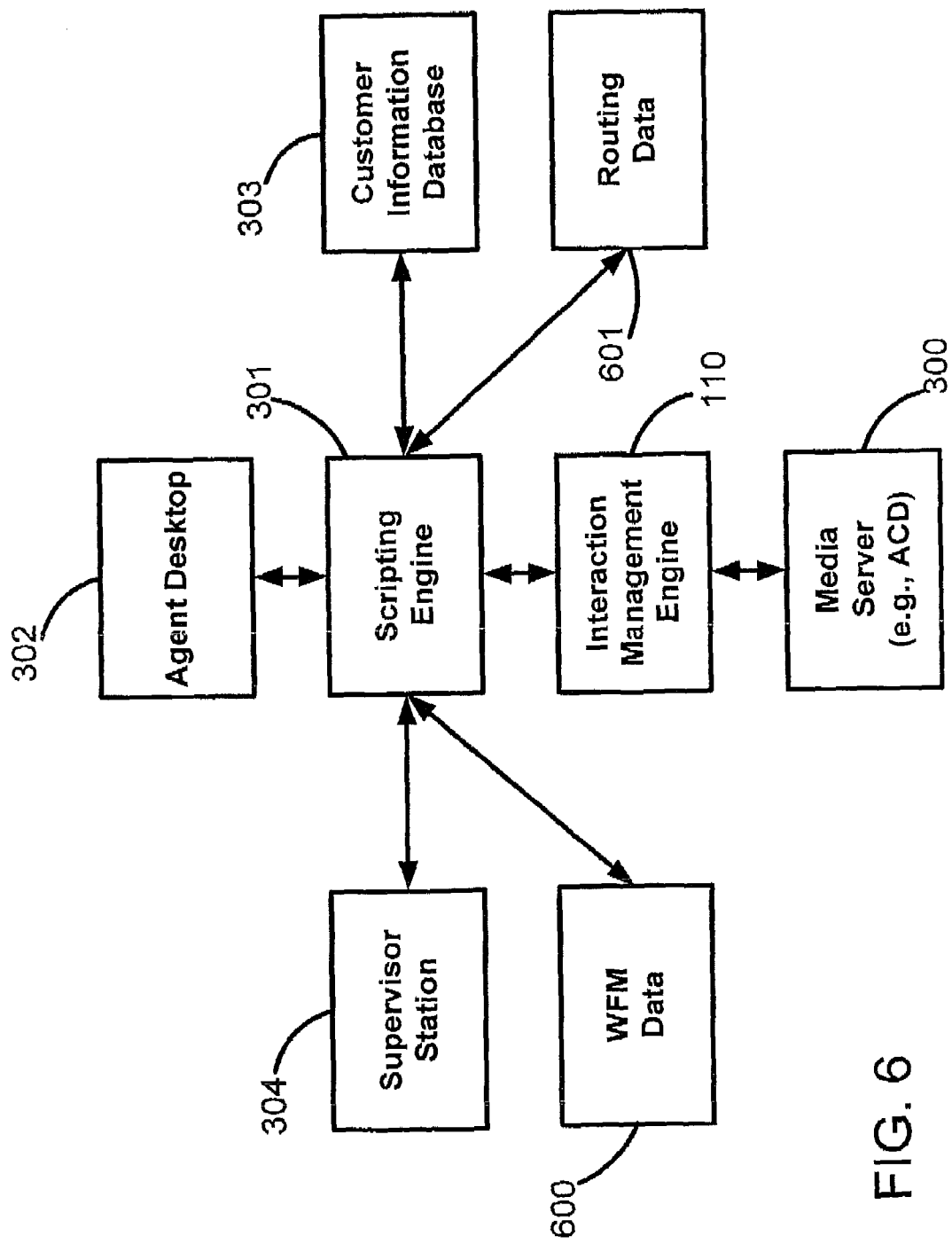
FIG. 6 is a diagram of an agent scripting system showing an embodiment of the present invention.

In another embodiment of the present invention, and referring to FIG. 6, the agent scripting system described previously is modified by the availability of WFM Data 600, and by the availability of routing data 601. The WFM data 600 can be generated either by the Adherence Module 109 or other components of the WFM system. The routing information 601 is generated by the routing engine 203. The information that can be passed via feedback mechanism 600 can be any information available to the workforce management system, and can be passed in any of a number of ways well established in the art. Similarly, the information that can be passed via feedback mechanism 601 can be any information available to the routing engine 203, and can be passed in any of a number of ways well established in the art. In an embodiment of the invention, the information is passed either from components of the WFM system or from the routing engine 203 to the agent scripting engine 301 via data that is "attached" to the call, or added to the predefined interaction information maintained by the interaction management engine 110. This is a common method in the art of passing contextual data concerning an ongoing interaction from one part of an interaction management system to another, in this case from routing to WFM. In another embodiment, data is passed directly either from components of the WFM system or from the routing engine 203 to the agent scripting engine 301 in the form of an XML data tree, another method well established in the art. In yet another embodiment, information can be passed either from components of the WFM system or from the routing engine 203 to the agent scripting engine 301 by insertion into a database table which is periodically read by the recipient components.

In an embodiment of the present invention, the WFM data 600 is adjusted forecast 103 data for the next forecasting increment (typically but not always, 15 minutes). Most WFM systems in the art continually update the forecast 103 during the day to reflect deviations from the initial forecast 103 that have occurred. While most agent scripting engines 301 have access to real time statistical information concerning contact center operations, this data is necessarily retrospective. Having access to the adherence module's 109 adjustments to the forecast 103 of the next time increment makes it possible for agent scripts to proactively react to impending problems before they hit. For instance, if the adherence monitor 109 informs the agent scripting engine 301 that the noon time segment is likely to have traffic at 125% of forecast 103, and service levels are predicted to fall very far below the standard set for the contact center as a result, then the agent scripting engine 301 can begin to send fewer unnecessary prompts to agents in an effort to immediately lower AHT (for example, cross-sell and up-sell prompts and satisfaction surveys could be eliminated proactively). Alternatively, the forecasting engine 102 can send the agent scripting engine 301 periodic target AHT values. Since the scripting engine 301 controls what is presented to the agent on the agent desktop 302 it has the ability to dynamically adjust the amount of material presented in order to meet the target AHT. It can be seen that this approach will make the AHT portion of the forecast 103 a self-fulfilling prophecy, and of course the amount of scheduling error in the schedule 108 will be significantly reduced. Furthermore, the adherence engine 109 can detect deviations in call volume from the forecast 103 and automatically adjust the target AHT and send it to the scripting engine 301 so that the desired service levels can be maintained with the current scheduled staffing. Additionally, when staffing deviations from the schedule 108 occur, the adherence module 109 can similarly modify the target AHT and notify the scripting engine 301 of its new target. Since the cost of either overstaffing or understaffing in a contact center can be very significant, it can be seen that the existence of feedback mechanisms between the workforce management system and the agent scripting system according to the present invention will have a significant beneficial impact on contact center operations with little difficulty.

In another preferred embodiment of the present invention, the multiple feedback paths 400, 401, 500, 600, and 601 are used together to achieve a higher level of integration between the three components (the routing system, the workforce management system, and the agent scripting system). The forecast engine 102 sends AHT targets for each time segment to the agent scripting engine 301, and it sends call volume targets to the routing engine 203 for the same periods. These targets are based on the historical data 100. Then, during operation, the routing engine 203 executes a routing strategy which attempts to keep each skill's or activity's call volumes at the target level, using various techniques involving interactive voice response (IVR) that are common in the air. These techniques can include handling some calls in the IVR entirely without giving the caller the option of getting an agent, giving other callers the option of waiting for an agent or getting handled in the IVR, giving yet other callers the option of setting a time for a callback from an agent with the appropriate skill, and so forth. In this latter case, the routing engine can suggest a time when the adherence module 109 has indicated the expected traffic will be lower than the forecast 103. At the same time, the agent scripting engine 301 manages agent interactions in order to hit the target AHT specified by the forecast engine 103. During operations, the adherence module 109 closely monitors AHT and call volume for each skill or activity (as it does in current systems), but it also provides notifications to both the routing engine 203 and the agent scripting engine 301 of deviations, and of new targets to be achieved. With the workforce management system thus setting adjustable settings for AHT and call volumes on a skill-by-skill or activity-by-activity basis, and with the routing system managing call volume and the agent scripting system managing AHT, then the staffing provided by the schedule will always be adequate. It will be seen that thus an integrated system of workforce management, routing and agent scripting is not limited to this scenario, which is merely exemplary, but in fact is capable of providing a high degree of control and predictability to contact center managers, and in particular it should be understood that particular factors such as AHT, service level, and so forth can be used as the dominant parameter while allowing the routing and agent scripting systems to adjust the other parameters in order to meet operational goals for the dominant parameter.

What is claimed is:

1. An integrated enterprise system, comprising:
    a workforce management system consisting of at least a forecasting engine, a business rules module, a scheduling engine, and an adherence module;
    a transaction management system including at least a transaction router and a scripting system; and
    a dedicated communication link coupling at least one of the forecasting engine and the adherence module with each of the scripting engine and the transaction router;
    wherein information directly shared on the communication link during a specific operating period enables functions of each of the coupled elements to consider values of variables from other of the coupled elements within the operating period.

2. The system of claim 1 wherein the enterprise is a contact center.

3. The system of claim 2 wherein the transaction router routes transactions, and the transactions include voice telephone calls and text messages.

4. The system of claim 2 wherein the workforce management system manages a workforce, and the workforce comprises agents of the contact center.

5. The system of claim 1 wherein variables include call-handling times and call volumes.

* * * * *